April 13, 1937. W. L. BRYANT 2,076,808
GRINDING MACHINE
Filed Nov. 2, 1932 7 Sheets-Sheet 7
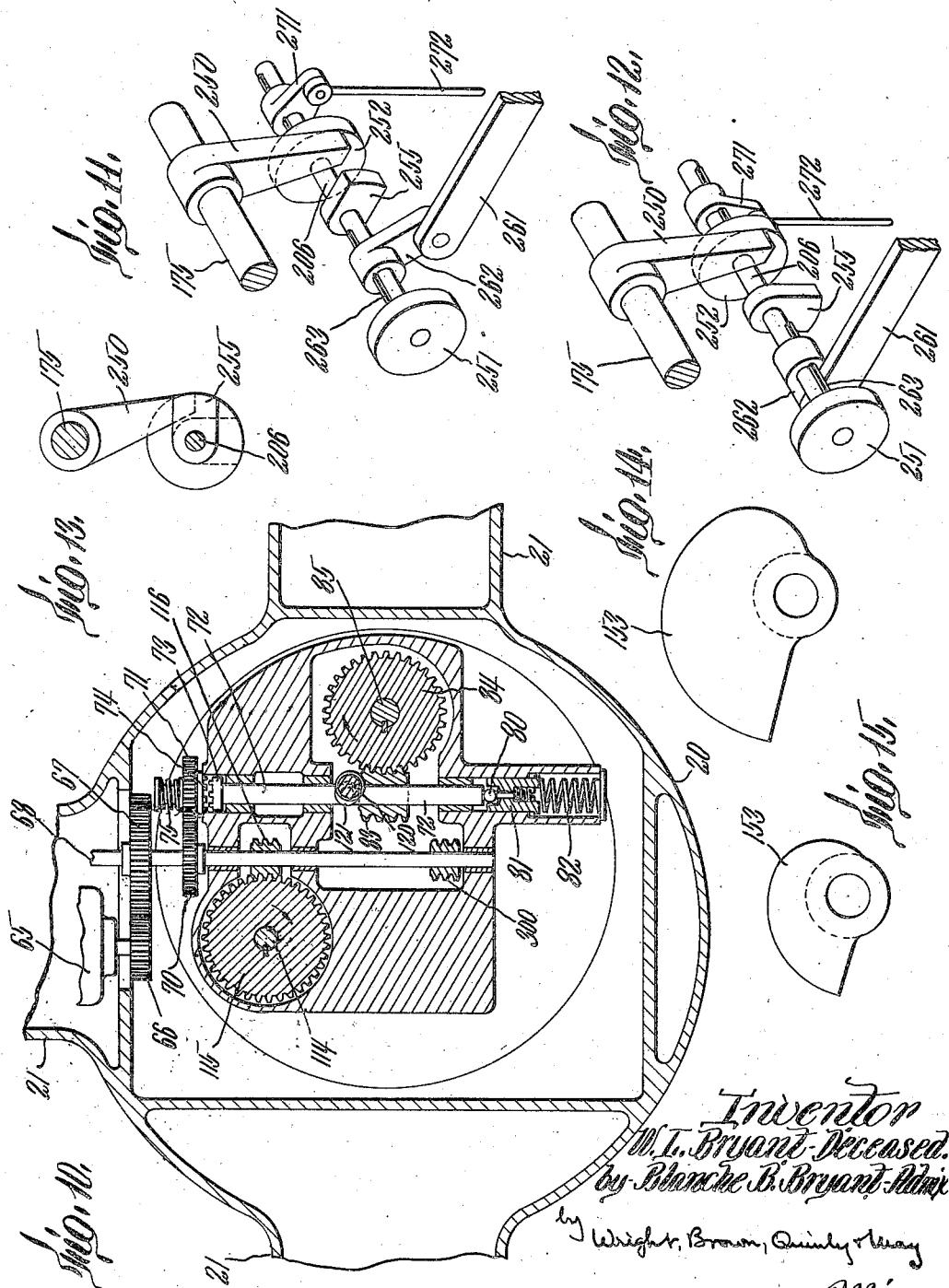

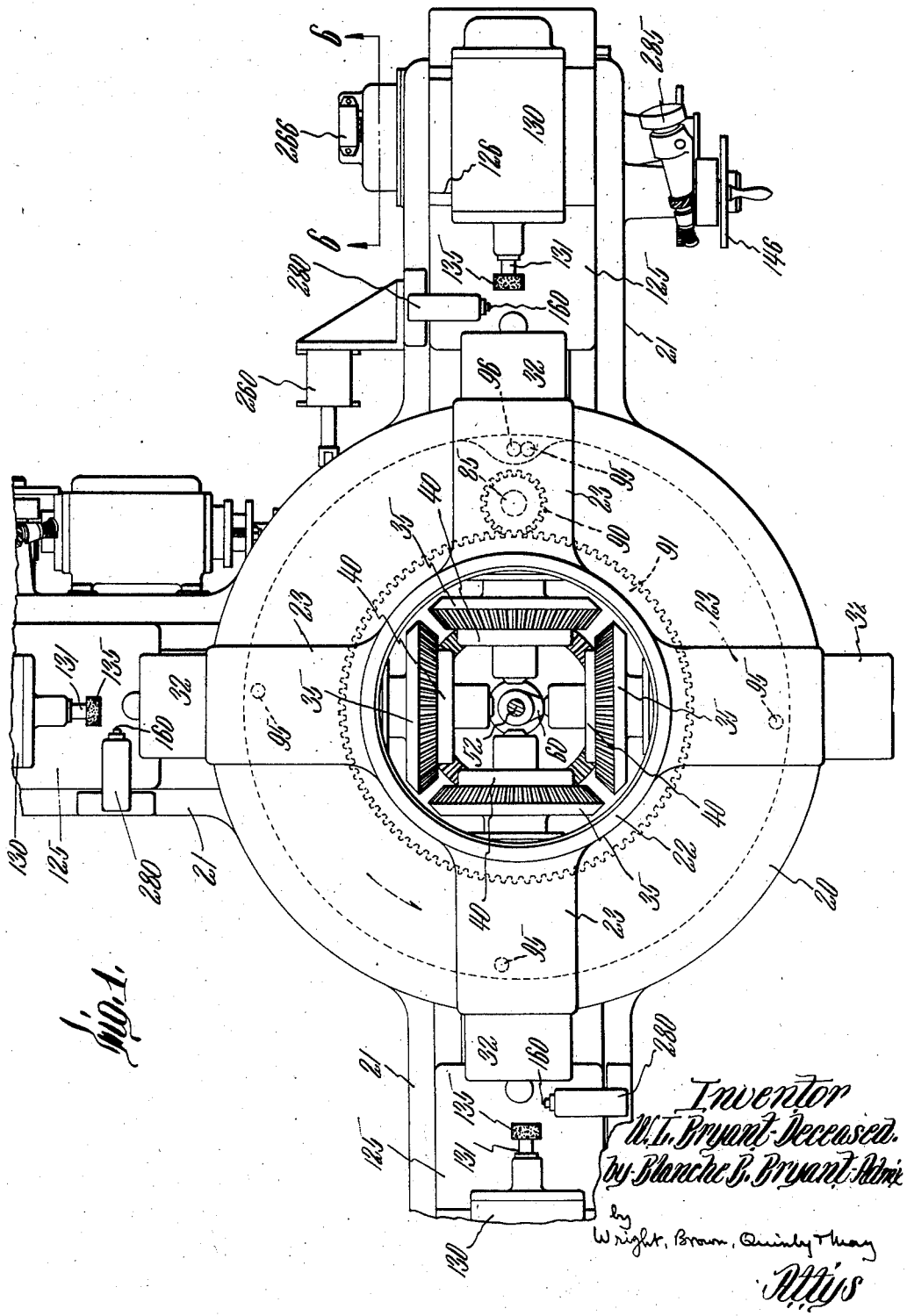

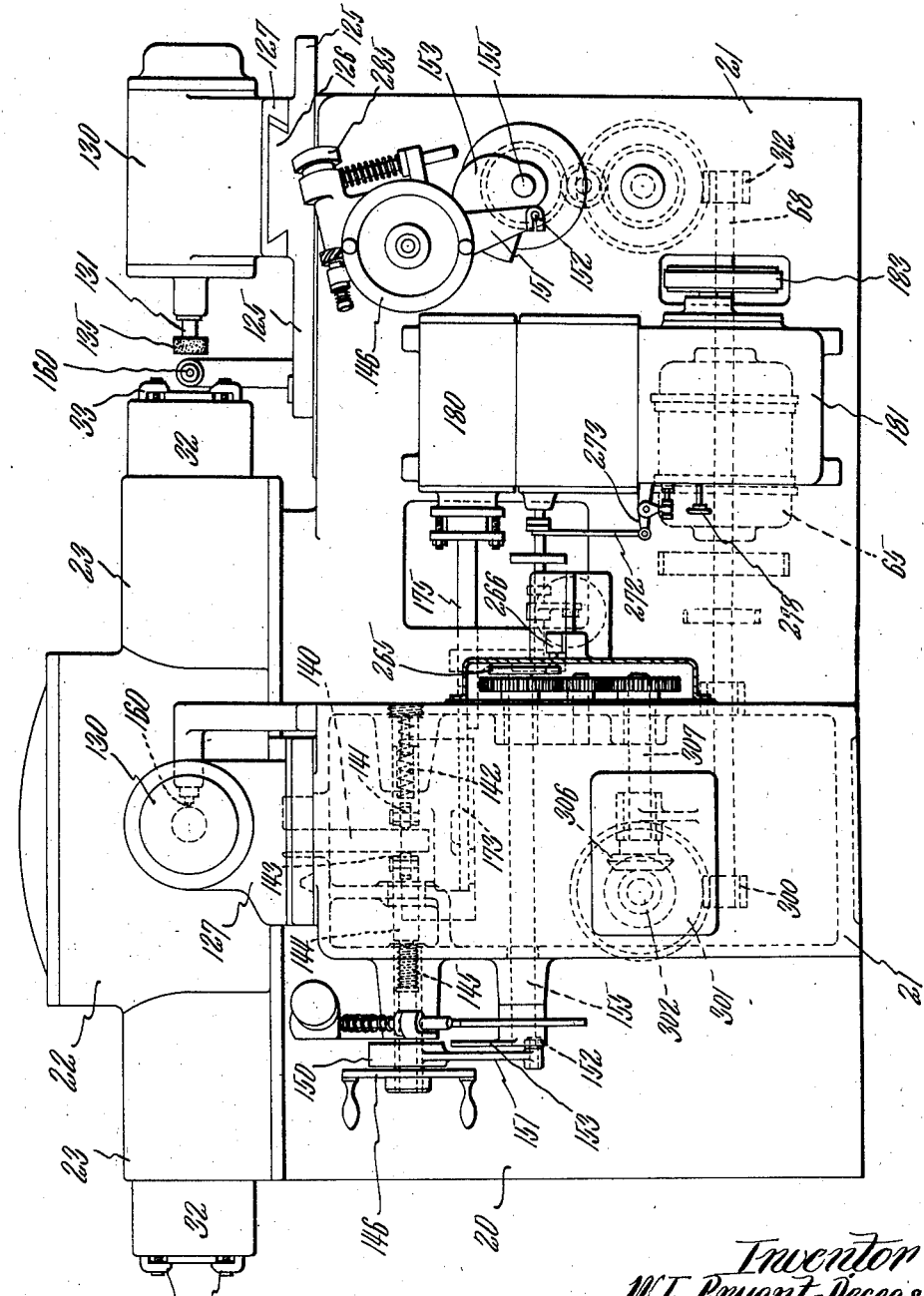

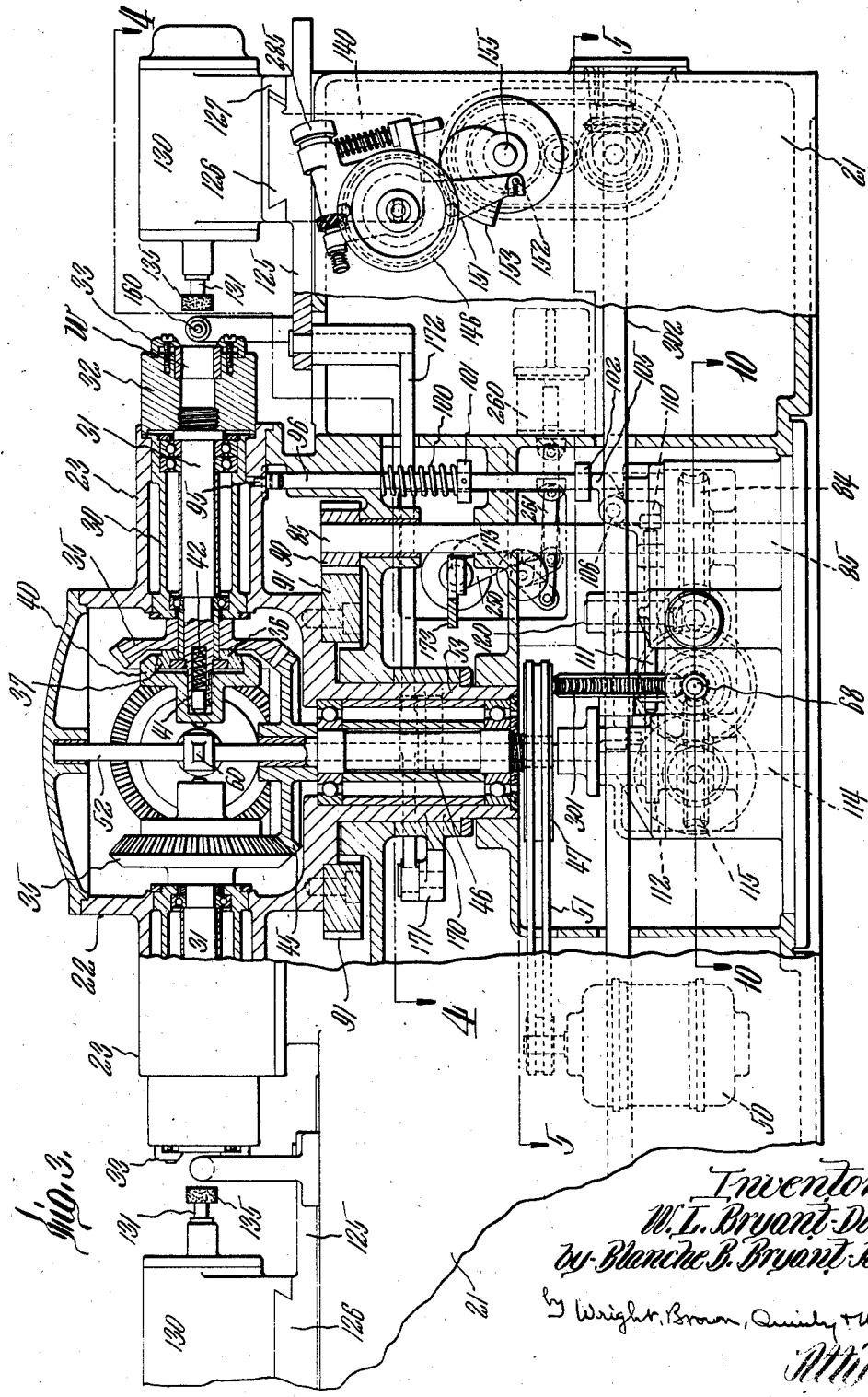

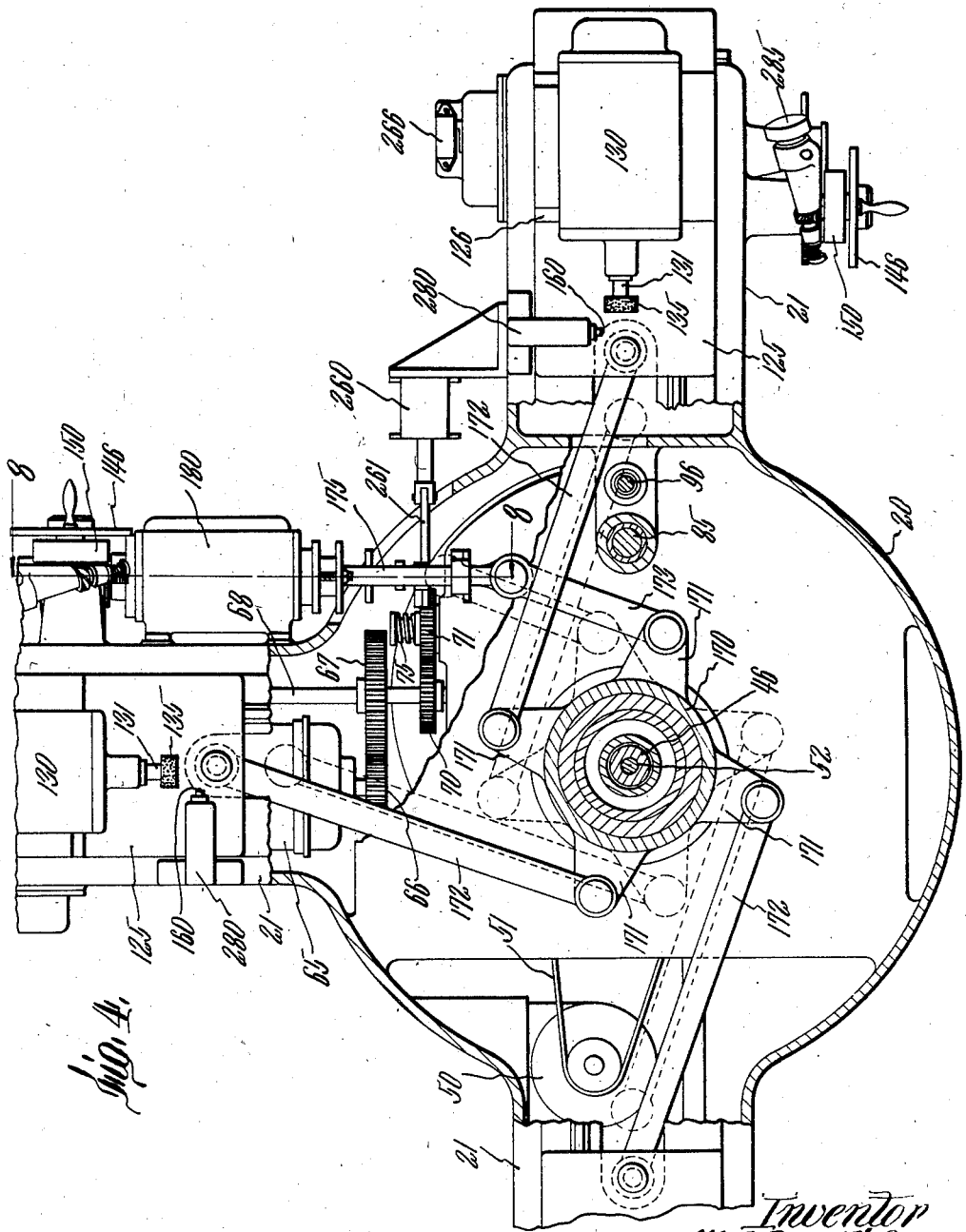

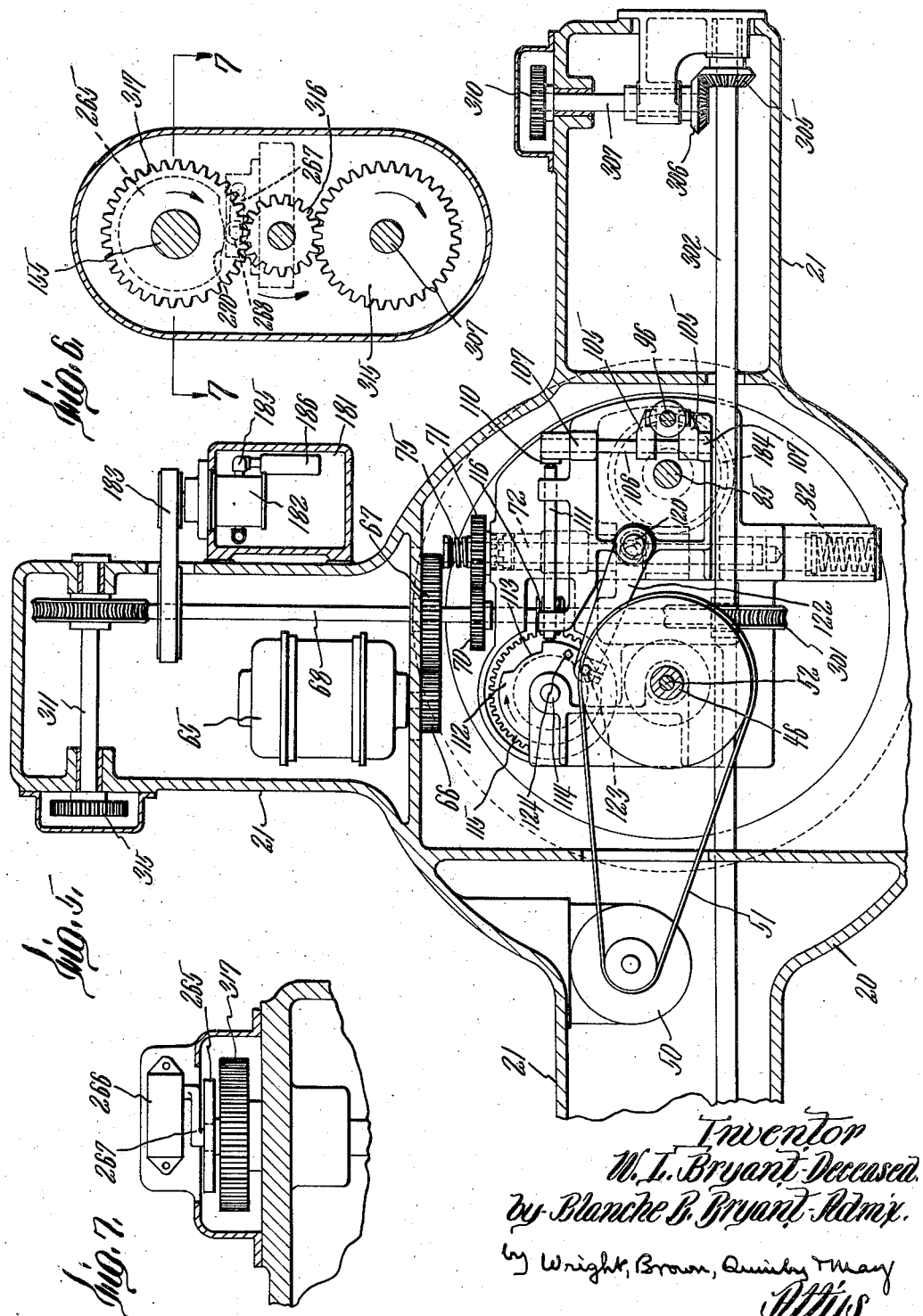

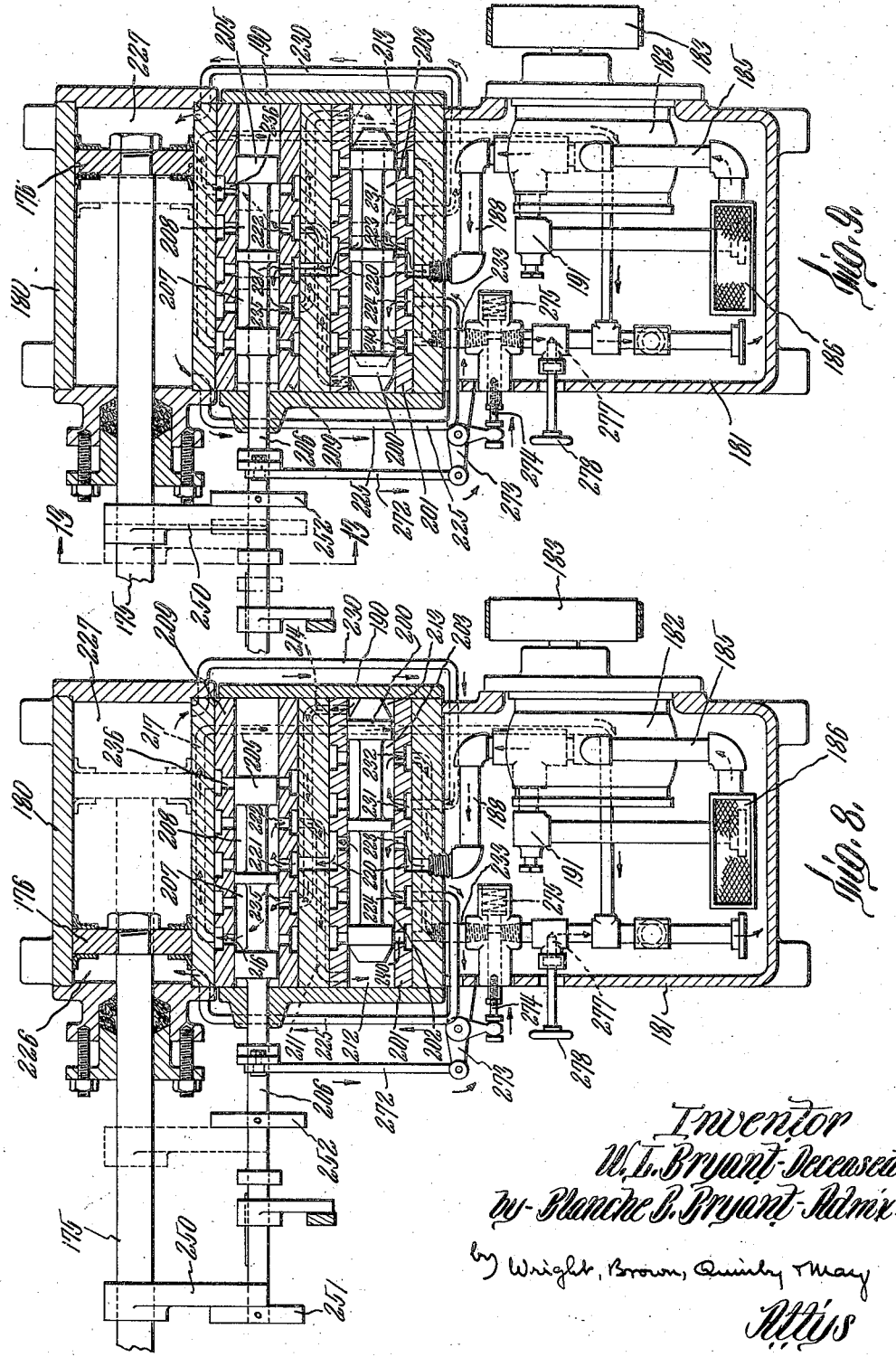

Patented Apr. 13, 1937

2,076,808

UNITED STATES PATENT OFFICE 2,076,808

GRINDING MACHINE

William L. Bryant, deceased, late of Springfield, Vt., by Blanche Brown Bryant, administratrix, Springfield, Vt., assignor to Bryant Chucking Grinder Company, Springfield, Vt., a corporation of Vermont Application November 2, 1932, Serial No. 640,846

16 Claims. (Cl. 51—53)

This invention relates to a multiple spindle grinding machine or the like, and more especially to a machine for internal grinding, having work-holders radially mounted in a turret for simultaneous presentation of a plurality of pieces of work to the several tools. The embodiment of the invention hereinafter described includes accurate indexing means for the turret, improved hydraulic mechanism for imparting traversing movements to the several tools with respect to the corresponding pieces of work, individual tool feeding mechanisms by which each tool can be independently fed against the work, automatic controlling means for the various operations of the apparatus as a whole, and other features which are apparent to one skilled in the art from the disclosure of the invention in the following description of an embodiment thereof and in the drawings, of which,—

Figure 1 is a plan view of apparatus embodying the invention, the lid of the turret being removed.

Figure 2 is a side elevation of the apparatus shown in Figure 1.

Figure 3 is a front elevation of the apparatus shown in Figure 1, a portion being cut away to show interior working parts in section.

Figure 4 is a section on the line 4—4 of Figure 3, a portion of the bed casting being broken away to show working parts beneath.

Figure 5 is a section on the line 5—5 of Figure 3.

Figure 6 is a section on the line 6—6 of Figure 1.

Figure 7 is a section on the line 7—7 of Figure 6.

Figure 8 is a section on the line 8—8 of Figure 4.

Figure 9 is similar to Figure 8, but illustrates some of the working parts in a different position of operation.

Figure 10 is a section on the line 10—10 of Figure 3.

Figure 11 is a perspective view of portions of the apparatus for controlling the hydraulic mechanism shown in Figures 8 and 9.

Figure 12 is a perspective view of the members shown in Figure 11, the working parts being in a different position of operation.

Figure 13 is an end elevation of portions of some of the members shown in Figure 11.

Figures 14 and 15 are elevations of cam members adapted for use in tool feeding mechanism.

The invention may be embodied in a machine including a bed casting 20 having a number of wings 21 extending laterally therefrom. On the body portion of the bed is mounted a turret 22 to rotate on a vertical axis. The turret and wings carry work-holders and tools in such a way that when the turret is in any one of its indexed positions, the tools can be presented to pieces of work carried by work-holders adjacent to the respective tools. In the embodiment of the invention illustrated on the drawings, the work-holders are shown as radially arranged on the turret, the tools being mounted on the wings of the bed in line with certain of the work-holders when the turret is in any one of its indexed positions. Four work-holders are shown, these being arranged at right angles to each other. Three tools are aligned respectively with three of the work-holders, the fourth work-holder being at a loading station in front of the machine. The invention, however, is not limited to these particular numbers of work-holders or tools. For the support of the work-holders, the turret 22 is provided with a series of radially extending arms 23. Within each arm 23 is fixed a hollow sleeve 30. A shaft 31 extends through this sleeve and is mounted therein on suitable ball bearings for rotation on a horizontal axis. Mounted on the outer end portion of the shaft 31 is a suitable chuck 32 which is adapted to hold a piece of work W.

In the embodiment illustrated in the drawings the work is shown as a cylindrical collar or bushing to be finished on its interior surface. Suitable clamps 33 may be employed to hold the work solidly in position in the chuck 32. The inner end of the shaft 31 projects into the interior of the turret 22. A miter gear wheel 35 is loosely mounted on the portion of the shaft within the turret. Fixed to a face of the gear wheel 35 is a ring 36 having a conical friction surface 37 on its rim. This surface is engageable by a complemental friction surface of a clutch member 40 which is splined to a reduced end portion 41 of the shaft 31. The inner end of the shaft is drilled axially to hold a suitable spring 42 which normally presses the friction face of the clutch member 40 into driving engagement with the friction face 37 of the ring 36. Thus the gear wheel 35 is usually connected to the shaft 31 through the clutch member 40. The gear wheels 35 of the several shafts 31 are all in mesh with a horizontal gear wheel 45, this gear being mounted on a vertical quill 46 on which is also mounted a suitable pulley 47. This pulley is preferably rotated constantly during the operation of the entire apparatus, a suitable driving means such as an electric motor 50 being operatively connected with the pulley 47 as by one or more belts 51. The quill 46 rotates about a fixed shaft or post 52, this post being anchored at its lower end in the bed 20. The turret 22 has a downwardly extending tubular projection 53 which surrounds the quill 46 and is separated therefrom by suitable ball bearings so that the quill and turret are both freely rotatable with respect to each other. It is desirable that the rotation of each chuck shaft 31 be stopped when the arm 23 containing it reaches work-loading position in which the arm and shaft extend forwardly of the apparatus. To this end a suitable cam lug 60 is mounted on the fixed vertical shaft 52. When the turret 22 revolves so as to move one of the arms 23 from the last operating station to the loading station, the clutch member 40 corresponding to this arm 23 moves into engagement with the fixed cam lug 60. This causes the clutch member 40 to move radially outward against pressure of its spring 42, disengaging its friction face from the frictional surface 37 of the ring 36. Thus the constantly turned gear wheel 35 is disconnected from its shaft 31 as long as the corresponding arm 23 remains in the loading position. As soon as this arm is swung by indexing movement of the turret 22 from the loading position to the first operation position, the clutch member 40 moves out of engagement with the cam lug 60 and thereupon connects the corresponding gear wheel 35 and shaft 31 for rotation of the latter.

Mechanism for indexing the turret 22 is illustrated in Figures 5 and 10. For this purpose a suitable motor 65 is connected through gears 66 and 67 to a shaft 68. Mounted on this shaft is a pinion 70 which meshes with a pinion 71 loosely mounted on a shaft 72. Mounted on the shaft 72 is one member 73 of a clutch, the other member 74 being formed on or rotatable with the pinion 71. An end portion of the shaft 72 projects through the hub of the pinion 71 and carries a spring 75 which tends to hold the clutch member 73 in engagement with the clutch member 74. The opposite end of the shaft 72 rests against a suitable end bearing 80 which, as shown, may consist of a ball carried by a sliding carriage 81, the latter being slidable in the direction of the axis of the shaft 72 to permit the clutch member 73 to move clear of the clutch member 74. A stiff spring 82 is provided to press the shaft 72 axially to a position in which the clutch members 73 and 74 are engaged so that the shaft may be driven. Mounted on the shaft 72 for rotation therewith is a suitable worm 83 which meshes with a worm gear 84, the latter being fixed on a vertical shaft 85. As shown in Figure 3, the shaft 85 carries a pinion 90 fixed at the upper end thereof, this pinion meshing with a ring gear 91 secured to the turret 22. Thus rotation of the gear wheel 84 results in indexing movement of the turret 22. Stops for limiting the indexing movement of the turret are provided in the form of stop pins 95, one of these pins being mounted on the under side of each of the arms 23, as shown in Figures 1 and 3. A stop rod 96 is vertically slidable in the bed 20 and is arranged so that its upper end portion is normally in the path of movement of the stop pins 95 when the turret is rotated on its axis. Indexing movement of the turret, as illustrated in Figure 1, is in a counter-clockwise direction, hence the gear wheel 84 (Figure 10) is driven in a clockwise direction by rotation of the worm 83. Indexing movement of the turrret brings one of the stop pins 95 into engagement with the upper end of the stop rod 96 which is in its path of motion. This prevents further rotation of the turret or of the gear wheel 84. The worm 83, however, continues to rotate with the shaft 72 and is compelled to travel axially, or tangent to the stationary gear wheel 84. As a result the shaft 72 is also moved axially until the clutch element 73 is moved out of engagement with the clutch element 74, this axial movement of the shaft being against the pressure of the springs 82 and 75. Thus the shaft 72 disconnects itself from the pinion 71, the spring 82 thereupon acting to hold the turret firmly in its indexed position with one of the stop pins 95 against the upper end portion of the stop rod 96.

Means for moving the stop rod 96 into and out of operative position are illustrated in Figures 3 and 5. A spring 100 is provided to react against a collar 101 mounted on the stop rod, in a direction to press the rod downwardly out of operative position. Fixed to the rod 96 is a second collar 102, the under face of which is engaged by a pair of arms 105 mounted on a cross shaft 106 which is rockably mounted in suitable bearings 107 and carries a crank arm 110. A thrust rod 111 bears at one end against the crank arm 110, the opposite end of the thrust rod 111 riding on the edge of a cam 112. This cam has a recess 113. The cam disk 112 may be mounted on a shaft 114 with a gear wheel 115 which is driven by a worm 116 mounted on the shaft 68. When the end of the rod 111 rides into the recess 113 of the cam 112, the rod is moved toward the left by the spring 100 acting through the shaft 106 and the crank arm 110, releasing the stop rod 96. When the end of the rod 111 rides out of the recess 113, the rod is pushed toward the right, raising the stop rod 96 into operative position against the pressure of the spring 100. When the turret is stationary, one of the stop pins 95 is strongly pressed against the stop rod 96 by the spring 82, so that the rod 96 may be frictionally held in locking position even when released. It is desirable to relieve this pressure to permit the stop rod to move clear of the pin with which it is engaged. To this end a vertical shaft 120 is provided with an eccentric member 121 bearing against an end of the worm 83. It is evident from Figure 10 that if the shaft 120 is rocked in a counter-clockwise direction, the eccentric member 121 will press against the worm 83 and this will result in an axial movement of the shaft 72 toward the end bearing 80. Such axial movement of the shaft will result in a counterclockwise movement of the gear wheel 84 and hence in a clockwise movement of the turret 22 sufficient to relieve the pressure between the stop rod 96 and the stop pin 95 in contact therewith. Rocking movement of the shaft 120 may be obtained by means of a lever arm 122 mounted thereon. A pin 123 is mounted near the end of this arm and is engageable by a pin 124 mounted on the cam member 112. The position of the pin 124 is so related to the recess 113 that the pin 124 comes into engagement with the pin 123 so as to rock the arm 122 and relieve the pressure of the stop rod 96 against a pin 95 just after the rod 111 rides into the recess 113 of the cam member 112 to release the rod 96. Thus when the pin 124 clears the pin 123, releasing the arm 122 and hence the shaft 72, the latter moves axially under the influence of the spring 82 so as to connect the clutch members 73 and 74 for the resumption of rotation of the shaft 72.. This causes indexing movement of the turret until the next succeeding pin 95 is stopped by engagement with the upper end of the stop rod 96 which has meanwhile been raised as the rod 111 rides out of the recess 113. This brings into alignment with the tools three of the arms 23 which carry the several pieces of work, the fourth arm 23 being at the loading station.

On each of the wings 21 of the bed is mounted a slide 125 movable toward and from the axis of the turret. A dovetail track 126 extends across each of these slides, an upper slide 127 being mounted thereon. This upper slide carries a suitable motor 130 having on its shaft 131 a grinding wheel 135 or other suitable tool. For the operation of each tool 135 it is necessary that the tool be fed laterally against the surface of the work to be ground, the amount of feeding movement being according to the depth of the layer to be ground from the face of the work. During the grinding operation it is necessary to traverse the tool back and forth over the surface to be ground, this traversing motion being in the direction of the axis of rotation of the tool.

The lateral feeding motion of the tool may be effected by bodily movement of the slide 127 across the slide 125. To this end, as shown in Figure 2, the slide 127 is provided with an integral fin or plate 140 projecting downwardly therefrom. A roller 141 is pressed against one face of this plate, as by a spring 142. A second roller 143 is pressed against the opposite face of the plate by a shaft 144 having a threaded portion 145 in engagement with the internally threaded hub portion of a wheel 146. A collar 150 is frictionally connected with the wheel 146 to rock therewith, the collar 150 having an arm 151 extending therefrom and provided at its outer end with a cam follower 152 adapted to ride on the edge of a cam 153. This cam is preferably of a spiral shape so that as the cam is revolved about the axis of a shaft 155 on which it is mounted, the cam follower 152 is swung away from the axis of the shaft 155, thus rocking the collar 150 and the wheel 146 which is connected therewith. This results in axial movement of the shaft 144 so that the carriage 127 is moved laterally, with the tool 135, against the pressure of the spring 142. This tool feeding mechanism includes means for adjusting the feed automatically to compensate for where surface portions of the tool are removed when the tool is dressed or trued by a suitable truing tool 160.

For the traversing movements of the tools across the surface of the work hydraulic apparatus may be provided as illustrated particularly in Figures 4, 8 and 9. As shown in Figure 3, a collar 170 is loosely fitted on the tubular extension 53 of the turret 22. Projecting radially from this collar 170 are four arms 171. Three of these arms are connected by suitable links 172 to respective tool slides 125. The fourth arm 171 is connected by a suitable link 173 to a piston rod 175, to the other end of which is secured a piston 176 reciprocable in a cylinder 180. The piston 176 is operated by a suitable power fluid such as oil which may be supplied in a reservoir 181. A pressure pump 182 is mounted within the reservoir and adapted to be driven from the shaft 68 as by a pulley and belt connection 183. A suction pipe 185 leads from a strainer box 186 to the suction end of the pump 182. A pressure line 188 is provided from the pump to a valve chest 190, a relief valve 191 being provided to relieve excess pressure in the pressure line 188. Oil escaping through the relief valve 191 is returned directly to the reservoir 181. Within the valve chest 190 is a main valve and a pilot valve. The main valve consists of a valve member 200 slidable axially in a hollow cylinder 201 fitted into and fixed in the valve chest. Through the wall of the cylinder are a number of ports for the control of the flow of oil. The valve member 200 is formed with portions 202 and 203 of reduced diameter whereby movable passages are provided to cooperate with the ports through the cylinder 201. The pilot valve includes a slidable valve member 205 having a stem 206 projecting out through the wall of the valve chest 190. The pilot valve member 205 is provided with two reduced portions forming a pair of separate passages 207 and 208 which are available to connect various ports which open through the wall of a hollow cylinder 209 in which this member slides. The hollow cylinder 209 is, like the cylinder 201, fitted into and fixed in the valve chest. The valve member 200 is entirely enclosed within the chest 190, there being pressure chambers 212 and 213 at its opposite ends. When the valve stem 206 is moved to the left, as illustrated in Figure 8, oil in the pressure pipe 188 flows into a circular channel 220 formed in the outer surface of the hollow cylinder 201, and thence through a port 221 into the passage 208, as indicated by arrows. From the passage 208 a port 222 leads to a passage 211 opening into the chamber 212 at the left hand end of the main valve member 200. Oil thus admitted to the chamber 212 moves the main valve member 200 to the right and holds it in the position illustrated in Figure 8, the movement of the valve member 200 causing some of the oil in the chamber 213 to be displaced and to escape through a passage 214 and a port 235 into the valve passage 207, whence the oil returns through a port 216 and a passage 217 to the reservoir. When the valve slide 200 is in this position, the pipe 188 communicates through the port 223 with the connecting passage 202, this passage opening into a port 224 which is connected by a suitable pipe 225 to the pressure chamber 226 to the left of the piston 176. At the same time the chamber 227 on the opposite side of the piston 176 is connected through a pipe 230 and a port 231 to the connecting passage 203, which, in turn, communicates through a port 232 to a return pipe 233 leading back to the reservoir 181. Thus oil under pressure is directed into the chamber 226 while the chamber 227 is connected with a return duct leading back to the reservoir 181. This results in movement of the piston 176 toward the right. It is evident from Figure 4 that such movement will cause a simultaneous movement of the slides 125 and the tools 135 toward the pieces of work respectively alined therewith.

Figure 9 represents a different position of operation for the various valve members, these positions being taken when the valve stem 206 is moved toward the right to the position illustrated. In this case oil from the pipe 188 flows through the circular passage 220 and the port 221 into the connecting passage 207. Thence it flows through the port 235 and the passage 214 into the chamber 213, some of the oil in the chamber 212 escaping through the passages and ports 211, 222, 208, 236, and 217 back to the reservoir. This causes the valve slide 200 to move to the left to the position shown. The effect of this movement is to direct oil from the passage 220 through the port 223 into the connecting passage 203. From here it is directed through a port 231 into the pipe 230 so that oil under pressure enters the chamber 227. At the same time the pipe 225, which communicates with the connecting passage 202 through the port 224, is connected through a port 240 to the return pipe 233, so that the oil causes the piston 176 to travel toward the left. For the operation of the valve stem 206, an arm 250 is carried by the piston rod 175. A pair of collars 251 and 252 are mounted on the valve stem 206 in the path of movement of the arm 250. Thus when the piston 176 approaches the left hand end of its stroke, the arm 250 engages the collar 251 and moves the pilot valve slide 205 to the position shown in Figure 8, this resulting in a shift of the main valve slide 200 so as to draw oil into the chamber 226 for the reverse movement of the piston 176 toward the right. In like manner when the piston approaches its limiting position toward the right, the arm 250 engages the collar 252 and moves the pilot valve member 205 to the position shown in Figure 9, this resulting in the introduction of pressure oil into the chamber 227 for movement of the piston toward the left again. The maximum stroke of the piston 176 is of sufficient length to withdraw the tool completely from the work. During the active operation of a tool on the work, it is usually desirable to impart traversing movement to the tool whereby it will travel back and forth a number of times across the work. For this purpose mechanism is provided for limiting the traversing stroke of the tool while it is in position for engagement with the work. A dog 255 is rigidly mounted on the stem 206. This stem is rockable so as to move the dog 255 into and out of the path of the arm 250. When the piston is initially actuated to move the tools from their inoperative positions to positions for operative engagement with the work, this stroke carries the arm 250 past the dog 255 to engage the collar 252 for the reversal of the valve. After the arm has passed the collar 252, the dog 255 is swung into the path of the arm 250, as illustrated in Figures 11 and 13, so that movement of the arm 250 in the opposite direction, after contact with the collar 252, will bring it into contact with the dog 255 when the piston 176 has completed a short stroke sufficient to move the tools through their traversing stroke. The arm 250 thereafter moves into alternate engagement with the collar 252 and the dog 255, causing the tools to traverse back and forth across the work on which they are operating. When the grinding operation of the tool has been completed, the stem 206 is rocked to swing the dog 255 clear of the path of the arm 250, as illustrated in Figure 12, thus allowing the piston to make a long stroke retracting the tools from the work. Suitable means for rocking the stem 206 may be provided as illustrated in Figures 4, 11 and 12. As shown, a solenoid 260 is connected by a suitable link 261 to a lever arm 262 which is loosely mounted on the stem 206 with a spline 263 to prevent relative rotation. Thus the arm 262 does not interfere with the axial movement of the stem 206 in shifting the pilot valve member 205. When the solenoid is deenergized, the stem 206 and members carried thereby are in the position illustrated in Figure 12. Energization of the solenoid causes the connecting link 261 to swing the arm 262 and thus to rock the stem 206 to the position shown in Figure 11. For the automatic control of the solenoid a suitable cam disk 265 may be provided, as shown in Figures 6 and 7. A switch 266 having an operating arm 267 is mounted adjacent to the cam disk 265 so that a cam follower 268, carried by the arm 267, is in engagement with the edge of the disk 265. This edge has a portion offset inwardly as at 270. When the cam follower 268 reaches the offset portion 270 of the cam edge, the arm 267 rocks opening the switch 266 and deenergizing the solenoid 260 to permit withdrawal of the tools from the work.

In order to control automatically the speed of the piston during its tool-retracting stroke, a second lever arm 271 is loosely mounted on the stem 206, but is splined thereon so as to rock with it. From this arm a connecting rod 272 extends to a bell crank 273 (Figures 8 and 9). This bell crank is operatively connected with a throttle valve stem 274. A spring 275 normally holds this valve open, but when the solenoid is deenergized, so that the stem 206 is rocked to the position shown in Figure 12, the arm 271 also rocks to close the throttle valve sufficiently to restrict the flow of oil from the piston chambers so as to reduce the speed of travel of the piston during the long retracting stroke of the tool from the work and the return of the tool to the next piece of work. This allows sufficient time for the indexing of the turret and also results in a relatively slow movement of the tool past the truing tool. This speed of travel may be controlled by suitable adjustment of the throttle valve. As the pump is constantly driven whether the return line is throttled or not, excess oil will be discharged through the spring-pressed relief valve 191 when the flow through the pipe 233 is restricted and will return directly into the reservoir. A hand operable throttle valve 277 may be provided to regulate the maximum speed of travel of the piston, this valve having a convenient handle 278 for manual adjustment.

A truing tool 280 is provided for each working tool, each truing tool being mounted on the bed in such a position as to be engaged by its corresponding working tool when the latter moves on its extended stroke toward or from the work. The tool feeding mechanism by which the working tool is fed transversely to engage the work is provided with an automatic mechanism, generally indicated as 285, for adjusting the range of feed each time the tool has been trued, so as to compensate for the material removed from the working tool in the truing operation. This automatic compensating mechanism is fully illustrated and described in Patent No. 1,794,440 granted to W. L. Bryant March 3, 1931.

The motor 65, in addition to driving the indexing shaft 86 and the indexing cam 112, may also be employed to drive the solenoid control cam 265 and the feed cam 153. To this end the shaft 68 may be provided with a worm 300 meshing with the gear wheel 301 mounted on a shaft 302. This shaft may be mounted in bearings near the ends of opposite wings 21 of the bed frame. The shaft 302 is operatively connected as by bevelled gears 305 and 306 in each of these wings to shafts 307. In the wing 21 of the bed frame into which the shaft 68 extends, a cross shaft 311 may be driven through a worm 312 on the shaft 68 and a gear wheel on the shaft 311 meshing therewith. Each of the shafts 307 and 311 is operatively connected with a corresponding shaft 155 as by a suitable train of gear wheels 315, 316, and 317. Each shaft 155 carries a corresponding feed cam 153, as hereinbefore described. On one of the shafts 155 may be mounted the solenoid control cam 265. As a result of this arrangement, the motor 65 is employed for the simultaneous driving of these various cams.

In order to synchronize the movements of the various cams with the indexing of the turret, the worm 83 is preferably of such a kind as to drive the gear wheel 84 and shaft 85 at about six times the speed of rotation of the indexing cam 112, the solenoid control cam 265, or the feed cam 153. As a result, the indexing movement of the turret to shift the chucks from one operating station to the next takes place during a period equivalent to about one sixth of a revolution of the other cams. This speed ratio may, of course, be altered as desired by selection of suitable gearing for the drive of the several cams.

In the operation of the apparatus as a whole, the turret is indexed while the tools are retracted from their operative position and are being moved slowly past their respective truing tools. The indexing movement of the turret is stopped when one of the stop pins 95 engages the upper end of the stop rod 96. As hereinbefore described, this causes the worm 83 to act as a nut on the gear wheel 84 so as to move the shaft 72 axially to disconnect the clutch member 73 from the clutch member 74 as indicated in Figure 10. The spring 82, presented against the end of the shaft 72 through the bearing 80, holds the turret firmly in its indexed position. The hydraulic mechanism is so regulated by previous adjustment of the needle valve 277 and the adjustment screw 274 that the piston 176 moves the tools 135 into the corresponding pieces of work shortly after the turret has reached its indexed position. When the piston 176 reaches its extreme position at the right, as indicated in Figure 9, the solenoid 260 is energized to swing the dog 255 into the path of the arm 250 so that the stroke of the tools is limited to a movement back and forth within the work. At the same time the constant revolutions of the shafts 155 brings the feed cams 153 into engagement with the cam followers 152, resulting in a lateral feeding movement of the tools against the surface of the work which is to be ground. During the grinding operation, the index cam 112 is constantly rotated, the de-energizing of the solenoid 260 being timed to swing the dog 255 clear of the arm 250 in time to permit the retraction of the tools from the work before the recess 113 in the index cam 112 reaches the end of the rod 111. Thus, the tools are all clear of the work when the rod 111 is permitted to move into the recess 113, releasing the stop rod 96. Immediately after this, the squared pin 124 on the cam disk 112 engages a pin 123 in the end of the arm 122 and rocks the arm 122 sufficiently to relieve the pressure of the spring 82, acting through a stop pin 95 on the stop rod 96. Thus the retraction of the stop rod 96 under the influence of gravity and the spring 100 is permitted so that the turret is then free to be revolved. The pin 123 thereupon rides clear of the pin 124, permitting the arm 122 to swing back and the shaft 72 to move axially so as to reengage the clutch members 73, 74. The shaft 72 is thereupon driven through the gear wheels 70 and 71, this resulting in indexing movement of the turret to the next position. Since the time required for the grinding step is considerable, ample time is available during the grinding step for an operator to remove the finished piece of work in the chuck at the work changing station, and to secure in the chuck a fresh piece of work to be ground. This cycle may be repeated indefinitely.

It is evident that various changes and modifications may be made in the specific embodiment of the invention herein shown and described, without departing from the spirit and scope of the invention as defined in the following claims.

The invention claimed is:

1. A machine of the class described comprising a bed, a turret rotatable thereon, a set of rotatable work-holding members with axes of rotation radial to the axis of rotation of the turret, a set of rotatable tool members with axes of rotation radial to the axis of rotation of the turret and respectively aligned with certain of the work-holding members, one said set of members being mounted in the turret, the other said set being arranged around the turret.

2. A machine of the class described comprising a bed, a turret rotatable thereon, a plurality of rotatable work-holders on said turret with axes of rotation perpendicular to the axis of the turret, a plurality of rotatable tools arranged around said turret for simultaneous axial alignment with certain of said work-holders, tool-carriages for said tools movable toward and from said turret, and means for simultaneously moving all said carriages toward or from said turret.

3. A machine of the class described comprising a bed, a turret rotatable thereon, a plurality of work-holders radially arranged on said turret, a plurality of tools arranged for simultaneous alignment with certain of said work-holders, tool carriages for said tools slidable toward and from said turret, and means for simultaneously reciprocating said carriages, said means including a quill coaxial with said turret, a plurality of arms projecting laterally from said quill, a power-driven reciprocating member, a link connecting said member with one of said arms, and other links connecting said tool slides respectively with other of said arms.

4. In a machine of the class described, reciprocating means including a power piston, means for supplying power fluid for the actuation of said piston, valve means including a valve stem for controlling said power fluid, a member operatively connected to said piston and reciprocable therewith, a pair of reversing elements mounted on said stem and engageable by said member to reverse the direction of travel of said piston at the ends of its stroke, an intermediate reversing element on said stem movable into the path of said member to reverse the piston at a point between the ends of its full stroke, and means for automatically moving said intermediate element into and out of the path of said member at predetermined intervals.

5. In a machine of the class described, a reciprocable piston, means for supplying power fluid to reciprocate said piston, valve means for controlling said fluid, said valve means including a rockable valve stem axially movable to direct the fluid against one side or the other of said piston, a member operatively connected with said piston and reciprocable therewith, a pair of reversing elements mounted on said valve stem in the path of movement of said member and engageable by said member when the piston reaches the limits of its stroke to reverse the direction of movement of the piston, an intermediate element mounted on said stem and rockable therewith into and out of the path of movement of said member, and automatic means for rocking said stem at predetermined intervals to move said intermediate element into and out of the path of said member.

6. In a machine of the class described having a tool, hydraulic means for reciprocating said tool, said means comprising a cylinder, a piston reciprocable therein, a piston rod projecting from an end of the cylinder for operative connection with said tool, a source of fluid under pressure, and control means for said fluid, said control means comprising a main valve with a valve member movable by fluid pressure on either end to direct pressure fluid into said chamber at one end or the other thereof, a pilot valve member and stem movable to direct fluid pressure against one end or the other of said main valve member, an arm projecting from the piston rod, a pair of stop members on said valve stem engageable by said arm at the ends of its stroke to shift the pilot valve and reverse the direction of movement of the piston, an intermediate stop member on said stem movable into the path of motion of said arm to shorten the stroke of the piston, and means for simultaneously moving said intermediate stop member out of the path of said arm and reducing the speed of travel of said piston.

7. A machine of the class described comprising a bed, a turret rotatable thereon about a vertical axis, a plurality of work-holders radially arranged on said turret, a plurality of tools arranged for simultaneous alignment with certain of said work-holders, carriages for said tools, and means for simultaneously reciprocating said carriages toward and from said turret, said means including a hydraulic piston operatively connected with said carriages and reciprocable through a short working stroke or a longer stroke to remove the tools from and to restore the tools to operative positions relative to the work, valve means controlling the movements of said piston and including a valve stem, means for shifting said valve stem automatically for short-stroke operation of said piston, and means for simultaneously modifying the action of said stem shifting means for a long stroke by the piston and for reducing the speed of motion of said piston during the longer stroke.

8. A machine of the class described comprising a bed, a turret rotatable thereon, a plurality of work-holders on said turret, a plurality of tools aligned with certain of said work-holders, tool carriages for said tools slidable on said bed, means for moving said tools and carriages to and from operative positions relative to the work, separate means for each tool for feeding said tool against the work during its operative engagement therewith, whereby the distance and rate of feed of each tool are independent of the feed of the other tools, and means for simultaneously actuating the feeding means of all the tools.

9. A machine of the class described comprising a bed, a turret rotatable thereon to a series of indexed positions, a plurality of work-holders radially arranged on said turret, a plurality of tools respectively aligned with certain of said work-holders when the turret is in an indexed position, means for simultaneously moving said tools toward and from said axis through a relatively short work traversing stroke and through a relatively long retracting stroke, means for automatically controlling the changes from traversing strokes to retracting strokes, means for feeding said tools against the work and retracting the tools therefrom, and common driving means for said controlling means and said feeding means.

10. A machine of the class described comprising a bed, a turret rotatable thereon about a vertical axis, a plurality of rotatable work-holders arranged on said turret with their axes of rotation perpendicular to the axis of the turret, a plurality of tools on said bed, said tools being arranged for simultaneous alignment with certain of said work-holders, common driving means for constantly rotating the work-holders which are aligned with said tools, and means for simultaneously traversing said tools axially with reference to the work.

11. In a machine of the class described, a tool, hydraulic means for traversing said tool through a working range and through an extended range to withdraw the tool from the work, said means including a valve and rockable valve stem longitudinally reciprocable to reverse the direction of movement of said tool, a member reciprocable with said tool, a pair of elements on said stem engageable by said member to operate said valve, and an intermediate element on said stem movable by rocking of said valve stem into and out of the path of said member.

12. An internal grinding machine, comprising a bed, a turret rotatable thereon, a plurality of rotatable work-holders carried by said turret and rotatable on axes radial to the axis of the turret, and a plurality of rotatable tools mounted on said bed and arranged around said turret, each tool being rotatable on an axis approximately aligned with the axis of a work-holder.

13. An internal grinding machine, comprising a bed, a turret rotatable thereon, a plurality of rotatable work-holders carried by said turret and rotatable on axes radial to the axis of the turret, a plurality of rotatable tools mounted on said bed and arranged around said turret, each tool being rotatable on an axis having the same direction as that of the work-holder adjacent thereto, and means for moving each tool laterally to offset its axis variably with respect to the axis of the adjacent work-holder.

14. An internal grinding machine, comprising a bed, a turret rotatably mounted thereon about a vertical axis, a plurality of tool holders carried by said turret and rotatable thereon about axes which are in a common horizontal plane, and a plurality of tools arranged about said turret, each said tool being rotatable about a horizontal axis approximately aligned with the axis of the tool-holder adjacent thereto, and means for independently offsetting the axes of the several tools horizontally during the rotation of said tools.

15. A machine of the class described, comprising a bed, a turret rotatable thereon, a plurality of work-holders mounted on said turret, a plurality of tools arranged for cooperation with certain of said work-holders, tool carriages for said tools slidable toward and from said turret, and means for simultaneously reciprocating said slides, said means including a quill coaxial with said turret, means for rotatively rocking said quill on its axis, and means operatively connecting said quill to said carriages.

16. A machine of the class described, comprising a rotatable turret having a hollow drive shaft, an inner hollow shaft coaxially mounted within said turret shaft and rotatable relatively thereto, rotatable work-holders mounted on said turret, driving connections between said inner shaft and said work-holders including a separate clutch for each work-holder, a stationary shaft within said inner shaft, and cam means carried by said stationary shaft for throwing out the clutch of one or another of said work-holders according to the angular position of said turret.

BLANCHE BROWN BRYANT,
*Administratrix of the Estate of William L. Bryant, Deceased.*